(12) United States Patent
Ichikawa et al.

(10) Patent No.: US 9,236,720 B2
(45) Date of Patent: Jan. 12, 2016

(54) HIGH VOLTAGE CONDUCTIVE WIRE AND WIRE HARNESS

(71) Applicant: YAZAKI CORPORATION, Tokyo (JP)

(72) Inventors: Hidehiro Ichikawa, Shizuoka (JP); Eiichi Tohyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 45 days.

(21) Appl. No.: 14/280,932

(22) Filed: May 19, 2014

(65) Prior Publication Data

US 2014/0251682 A1    Sep. 11, 2014

Related U.S. Application Data

(63) Continuation of application No. PCT/JP2012/080805, filed on Nov. 21, 2012.

(30) Foreign Application Priority Data

Nov. 21, 2011 (JP) ................. 2011-253417

(51) Int. Cl.
 *H02G 3/04* (2006.01)
 *H01B 7/00* (2006.01)
 *B60R 16/02* (2006.01)

(52) U.S. Cl.
 CPC .......... *H02G 3/0418* (2013.01); *B60R 16/0215* (2013.01); *H01B 7/0045* (2013.01)

(58) Field of Classification Search
 CPC .......................... H02G 3/0418; H01B 7/0045
 USPC ............................................ 174/72 A, 114 R
 See application file for complete search history.

(56) References Cited

U.S. PATENT DOCUMENTS

| 3,974,398 A | * | 8/1976 | Othmer | H01B 7/16 307/147 |
| 4,317,002 A | * | 2/1982 | Spicer | H01B 9/04 174/105 R |

(Continued)

FOREIGN PATENT DOCUMENTS

| CN | 201556690 | * | 8/2010 |
| CN | 201556690 U | * | 8/2010 |

(Continued)

OTHER PUBLICATIONS

International Search Report and Written Opinion of the International Search Report for PCT/JP2012/080805 dated Mar. 5, 2013.

(Continued)

*Primary Examiner* — Timothy Thompson
*Assistant Examiner* — Charles Pizzuto
(74) *Attorney, Agent, or Firm* — Kenealy Vaidya LLP

(57) ABSTRACT

A high voltage conductive wire includes a first conductor, configured to perform as one of a plus pole and a minus pole, a first insulator, provided outside of the first conductor, a second conductor, configured to perform as the other of the plus pole and the minus pole, provided outside of the first insulator, and formed by a metallic pipe, and a second insulator, provided outside of the second conductor so as to cover an outer face of the second conductor. A cross sectional area of the second conductor is set corresponding to a cross sectional area of the first conductor. The second conductor is configured to hold a shape itself so as to be arranged along an arrangement pathway.

4 Claims, 7 Drawing Sheets

(56) References Cited

U.S. PATENT DOCUMENTS

| | | | | |
|---|---|---|---|---|
| 4,630,459 | A | * | 12/1986 | Elliott .................... B21D 7/022 226/149 |
| 7,511,225 | B2 | * | 3/2009 | Wiekhorst ........... H01B 7/0233 174/113 R |
| 2004/0099427 | A1 | * | 5/2004 | Kihira ................. B60L 11/1803 174/359 |
| 2004/0231882 | A1 | * | 11/2004 | Hattori ................. H01B 13/222 174/106 R |
| 2006/0272845 | A1 | | 12/2006 | Galey et al. |
| 2009/0229880 | A1 | * | 9/2009 | Watanabe .............. H01R 4/183 174/72 A |
| 2010/0319956 | A1 | | 12/2010 | Ballard et al. |
| 2011/0120747 | A1 | | 5/2011 | Muneyasu et al. |
| 2012/0181059 | A1 | | 7/2012 | Radermacher et al. |

FOREIGN PATENT DOCUMENTS

| | | |
|---|---|---|
| CN | 102119428 A | 7/2011 |
| EP | 0 938 102 A2 | 8/1999 |
| EP | 1 113 461 A1 | 7/2001 |
| JP | 2004-171952 A | 6/2004 |
| JP | 2007-59085 A | 3/2007 |
| JP | 2007-507061 A | 3/2007 |
| JP | 2008-543017 A | 11/2008 |
| JP | 2009-214631 A | 9/2009 |
| WO | 2005/024849 A2 | 3/2005 |
| WO | 2011/011776 A1 | 1/2011 |

OTHER PUBLICATIONS

Chinese Office Action for the related Chinese Patent Application No. 201280057035.8 dated Jul. 22, 2015.

European Office Action for the related European Patent Application No. 12 814 000.1 dated Sep. 15, 2015.

Japanese Office Action for the related Japanese Patent Application No. 2011-253417 dated Sep. 15, 2015.

* cited by examiner

HIGH VOLTAGE CONDUCTIVE WIRE AND WIRE HARNESS

CROSS REFERENCE TO RELATED APPLICATIONS

This application is a continuation of PCT application No. PCT/JP2012/080805, which was filed on Nov. 21, 2012 based on Japanese Patent Application (No. 2011-253417) filed on Nov. 21, 2011, the contents of which are incorporated herein by reference.

BACKGROUND OF THE INVENTION

1. Field of the Invention

The present invention is related to a high voltage conductive wire and a wire harness.

2. Description of the Related Art

In order to electrically connect, for example, a battery and an inverter unit to each other in a hybrid vehicle or an electric vehicle, a high voltage wire harness is used. The wire harness connecting the battery and the inverter unit to each other is configured to have two pieces of high voltage conductive wires forming a plus circuit and a minus circuit, and an covering member for protecting the above high voltage conductive wires.

In a case where the covering member is a pipe made of metallic as described in PTL 1 for example, the two pieces of high voltage conductive wires are accommodated in the metallic pipe in a juxtaposed fashion.

CITATION LIST

Patent Literature

[PTL 1] JP-A-2004-171952

SUMMARY OF THE INVENTION

Since the above high voltage conductive wires transmit electric power for a driving system, thick electric wires are to be used for the high voltage conductive wires. Therefore, in a case where the metallic pipe is used as a covering member in a wire harness, two pieces of thick wires are accommodated in the covering member in a juxtaposed fashion so that a problem may occur that a diameter of the covering member becomes large. In a case where the diameter of the covering member is large, when the wire harness is arranged, for example, under a floor of an automobile, it is impossible to achieve arrangement of the wire harness capable of providing a sufficient distance with respect to the ground so that it may result in a problem of causing a damage or the like.

Meanwhile, if arrangement capable of providing a sufficient distance with respect to the ground is not achieved, it could be thought that the material of the covering member is limited to a metallic material in order to ensure a sufficient protecting function. However, the limitation of the material may possibly restrict variation of the covering member.

It is therefore one advantageous aspect of the present invention to provide a high voltage conductive wire of which the diameter can be reduced and a wire harness having a covering member of which the diameter can be reduced. According to one advantage of the invention, there is provided a high voltage conductive wire, comprising:

a first conductor, configured to perform as one of a plus pole and a minus pole;

a first insulator, provided outside of the first conductor;

a second conductor, configured to perform as the other of the plus pole and the minus pole, provided outside of the first insulator, and formed by a metallic pipe; and a second insulator, provided outside of the second conductor so as to cover an outer face of the second conductor, wherein a cross sectional area of the second conductor is set corresponding to a cross sectional area of the first conductor.

The second conductor may be configured to hold a shape itself so as to be arranged along an arrangement pathway.

In the high voltage conductive wire, a conductive member or a terminal may be connected to an end of the second conductor.

According to another advantage of the invention, there is provided a wire harness, comprising: the high voltage conductive wire; and a covering member, covering the high voltage conductive wire.

The wire harness may further comprise a electromagnetic shield member, provided between the high voltage conductive wire and the covering member.

According to the present invention, since the plus circuit and the minus circuit are formed not by two wires but by a single wire, an effect is exhibited that the high voltage conductive wire having the small diameter can be provided. Therefore, in a case where the above high voltage conductive wire having the small diameter is used, an effect is exhibited that a diameter of a covering member for protecting the above high voltage conductive wire can be reduced. In addition, in accordance with the invention, since the metallic pipe is used for the high voltage conductive wire, an effect is exhibited that a necessary and sufficient conductor cross sectional area can be retained or the manufacturability can be improved. Further, in accordance with the invention, the second insulator is provided in such a fashion that it covers the outer face of the metallic pipe corresponding to the other one of the plus pole conductor and the minus pole conductor. Therefore, in a case where a shield structure is to be applied to the high voltage conductive wire of the invention, an effect that the above application can be facilitated, is exhibited.

According to the invention, the effect is exhibited that holding of the shape along the arrangement pathway can be achieved, or the effect that it is not necessary to separately prepare a member for holding the shape along the arrangement pathway.

According to the invention, the effect is exhibited that even when the metallic pipe is used, electric connection with a connection target can be appropriately carried out by connecting a conductive member or a terminal to the end of the metallic pipe.

According to the invention, an effect that the wire harness having the covering member of which the diameter is reduced can be provided is exhibited. In addition, in accordance with the invention, in a case where a wire harness is arranged, for example, under a floor of an automobile, an effect is exhibited that the arrangement capable of providing a sufficient distance with respect to the ground can be achieved, and thereby the covering member can be formed of a material other than a metallic material.

According to the invention, an effect that the wire harness capable of obtaining a shielding effect can be provided is exhibited.

BRIEF DESCRIPTION OF THE DRAWINGS

FIG. 1A is a schematic view showing an arrangement fashion of the wire harness, and FIG. 1B is a schematic view showing structures of the wire harness and the high voltage conductive wire.

DETAILED DESCRIPTION OF THE EXEMPLARY EMBODIMENTS

Figure 1A:
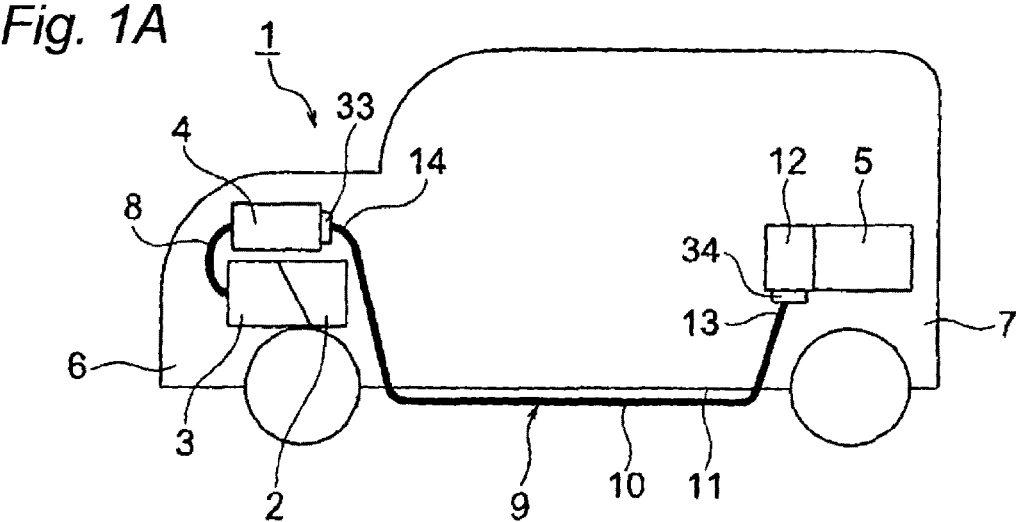
FIGS. 1A and 1B are schematic views showing a high voltage conductive wire and a wire harness according to an embodiment of the invention.
Figure 1B:
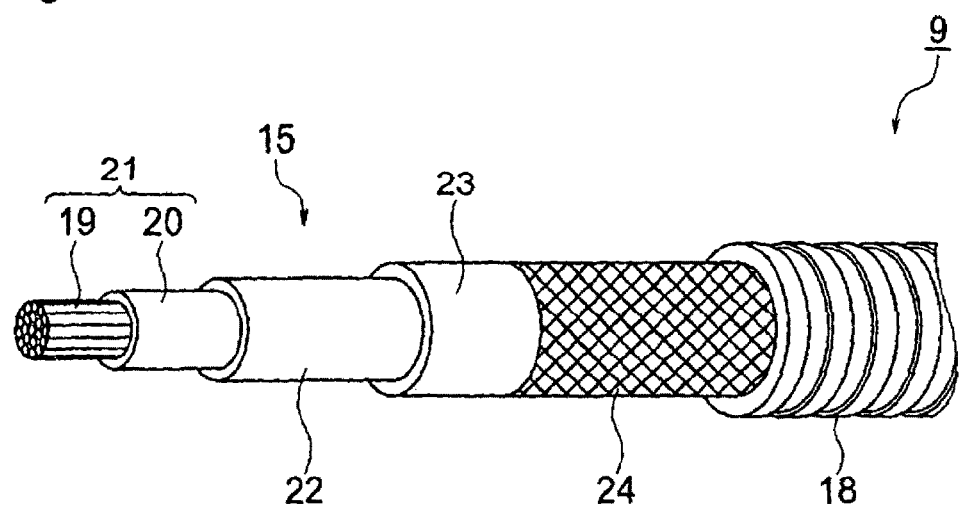
Figure 2:
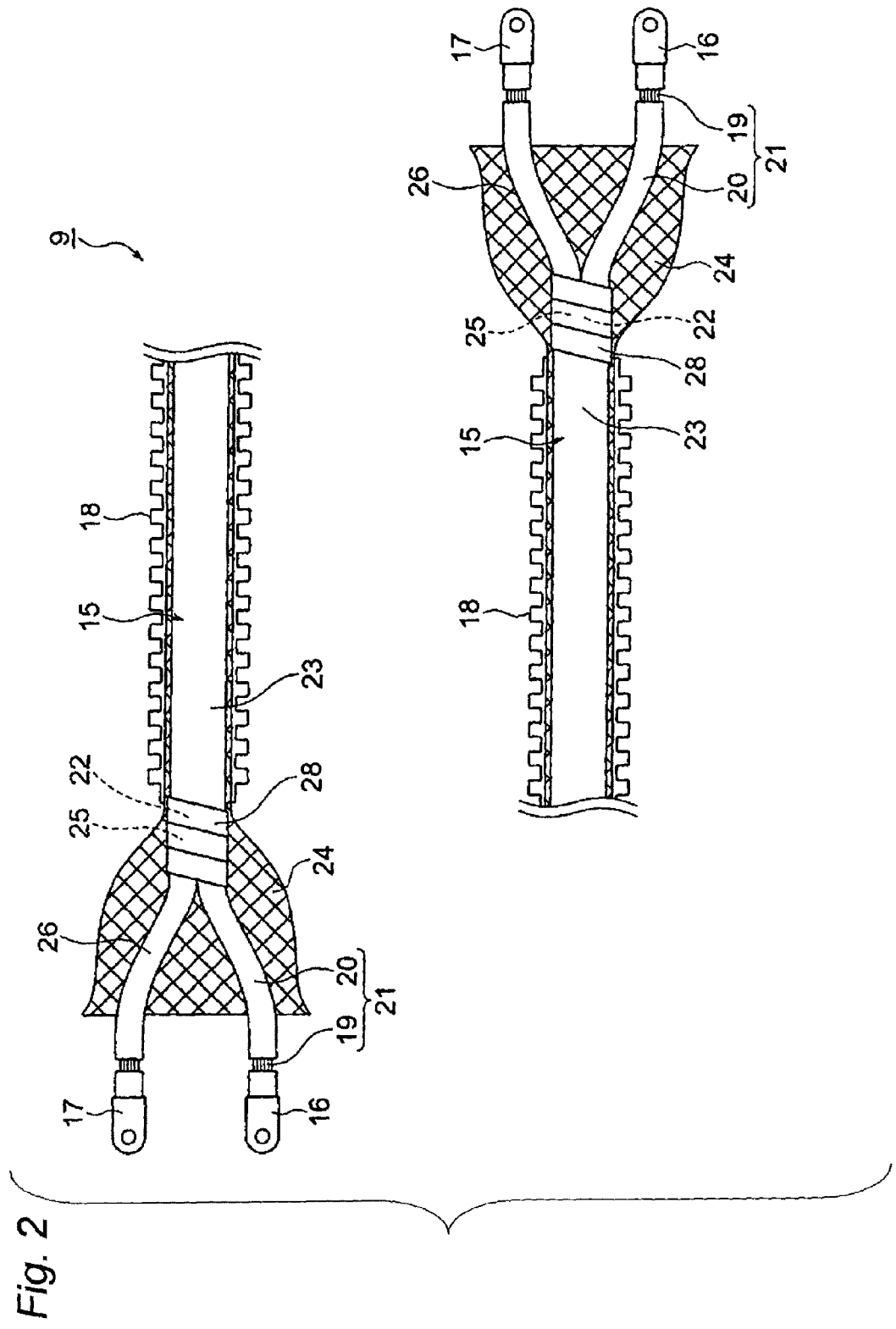
FIG. 2 is a cross sectional view showing the wire harness shown in FIG. 1 including both terminals thereof.
Figure 3:
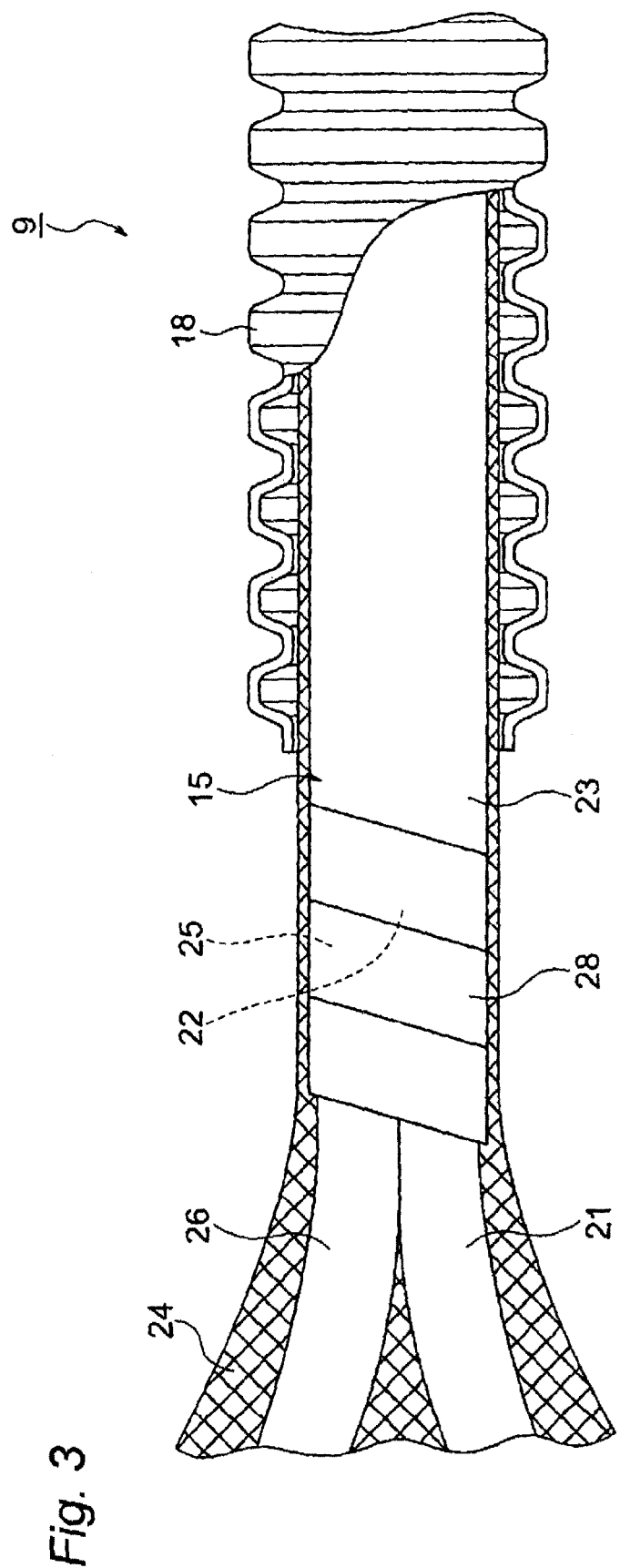
FIG. 3 is an enlarged cross sectional view showing the terminal of the wire harness shown in FIG. 2.
Figure 4A:
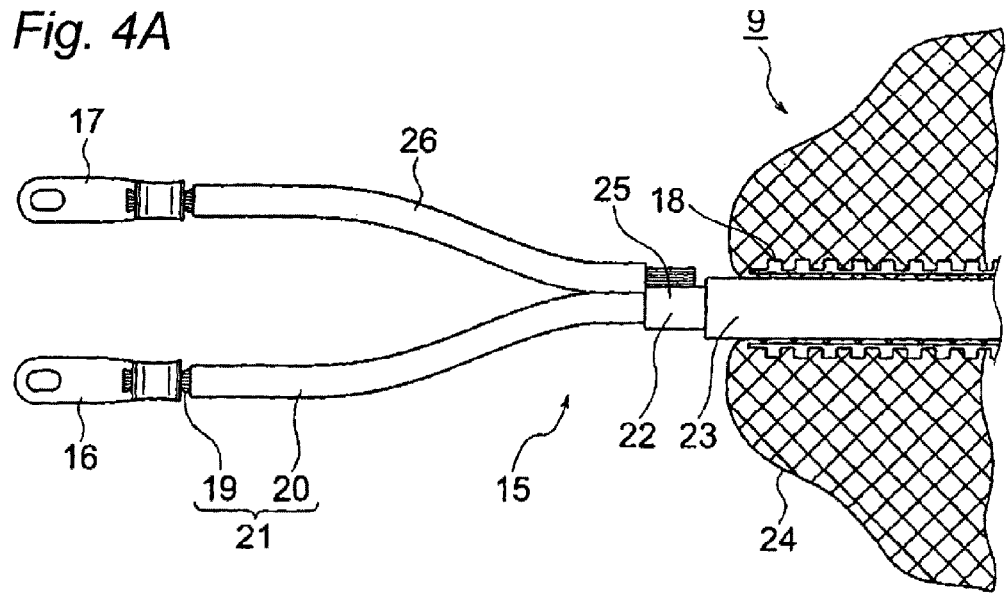
FIGS. 4A and 4B are schematic views explanatorily showing a method of attaching a conductive member to an end of a minus pole conductor.
Figure 4B:
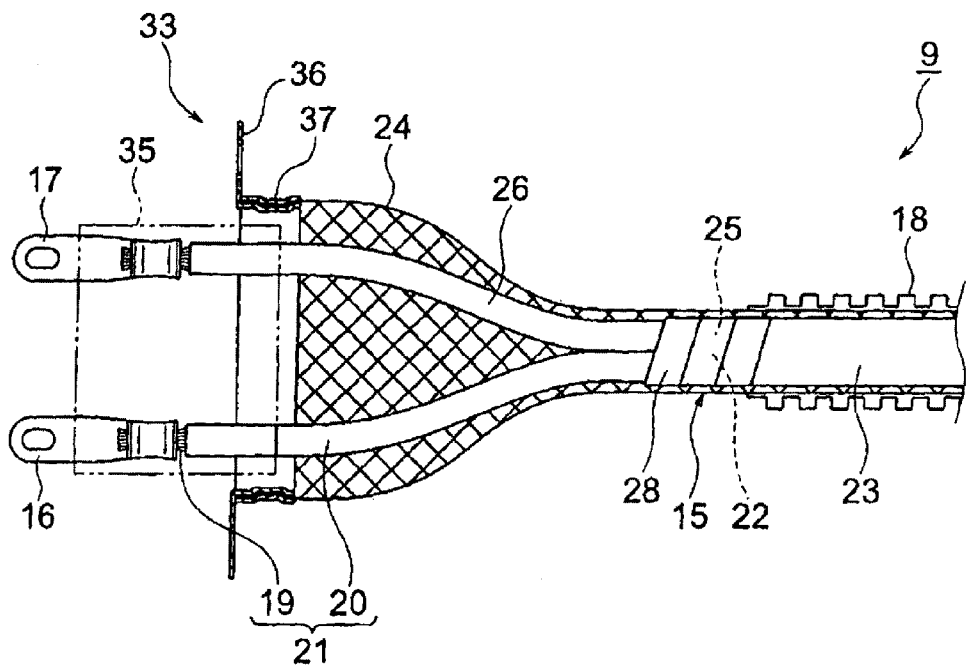
Figure 5A:
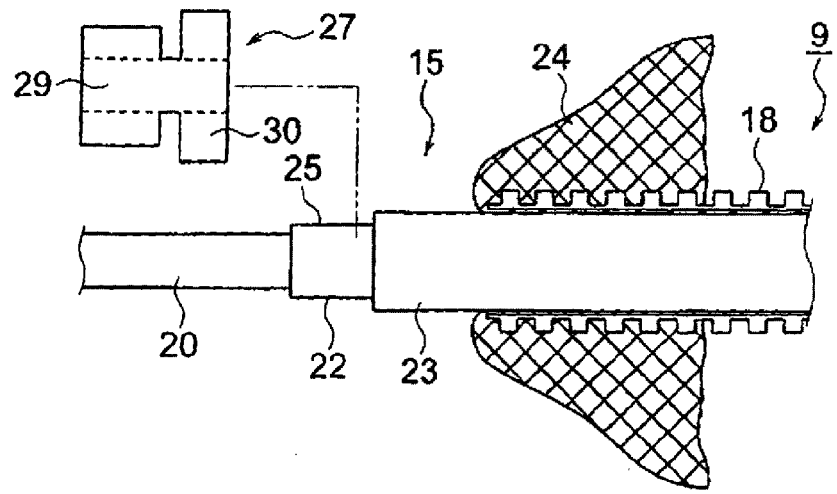
FIGS. 5A to 5C are schematic views explanatorily showing a method of attaching a terminal to an end of a minus pole conductor.
Figure 5B:
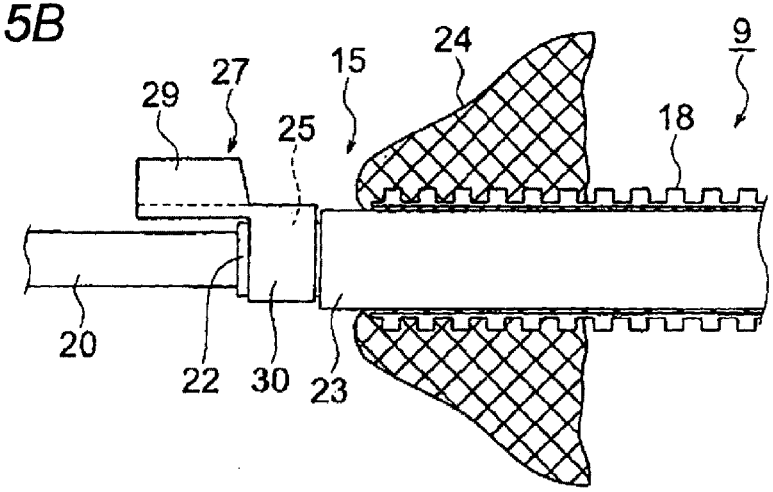
Figure 5C:
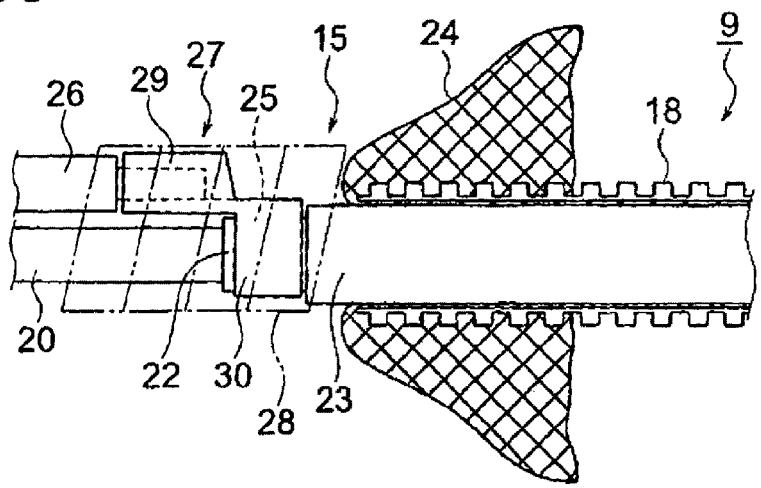
Figure 6:
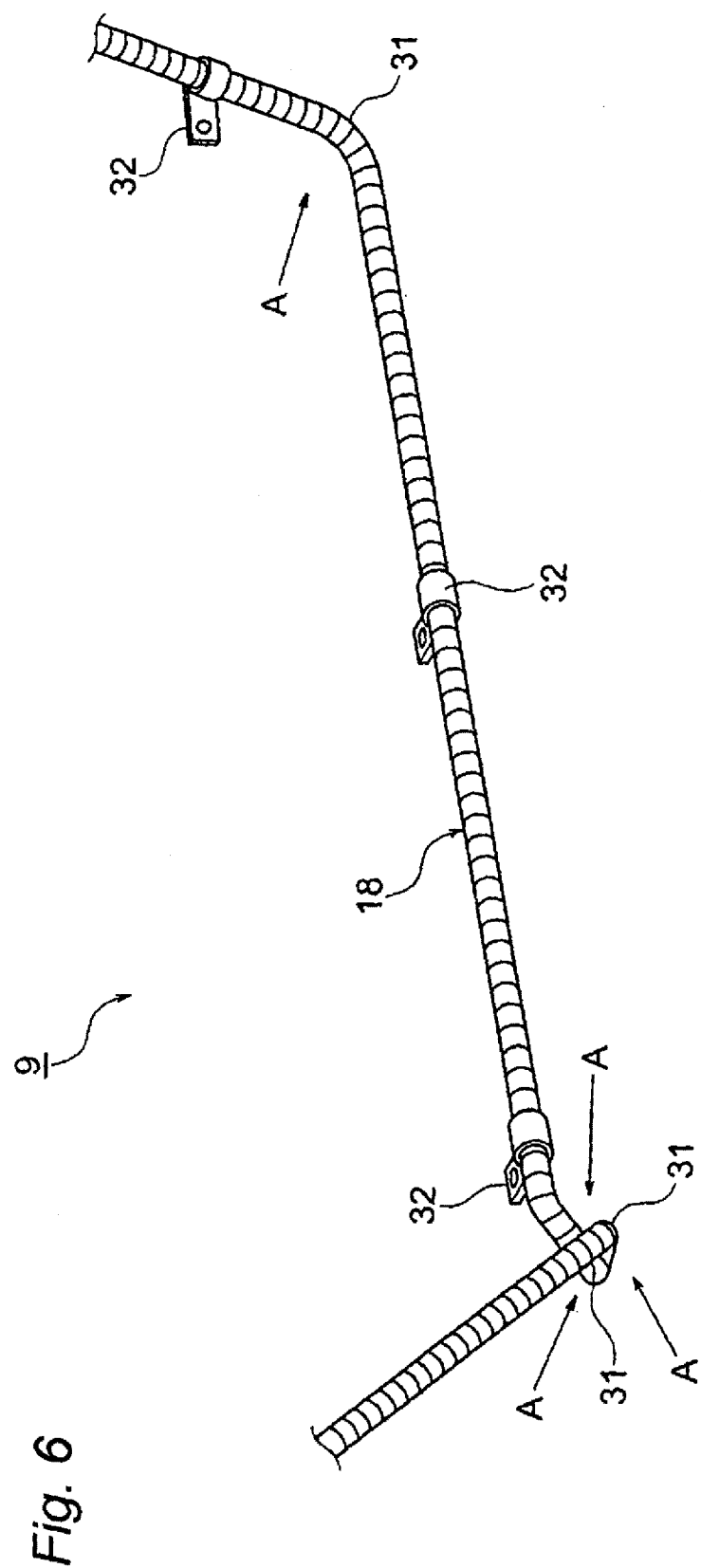
FIG. 6 is a perspective view showing a state that a bent section is formed on the wire harness.
Figure 7A:
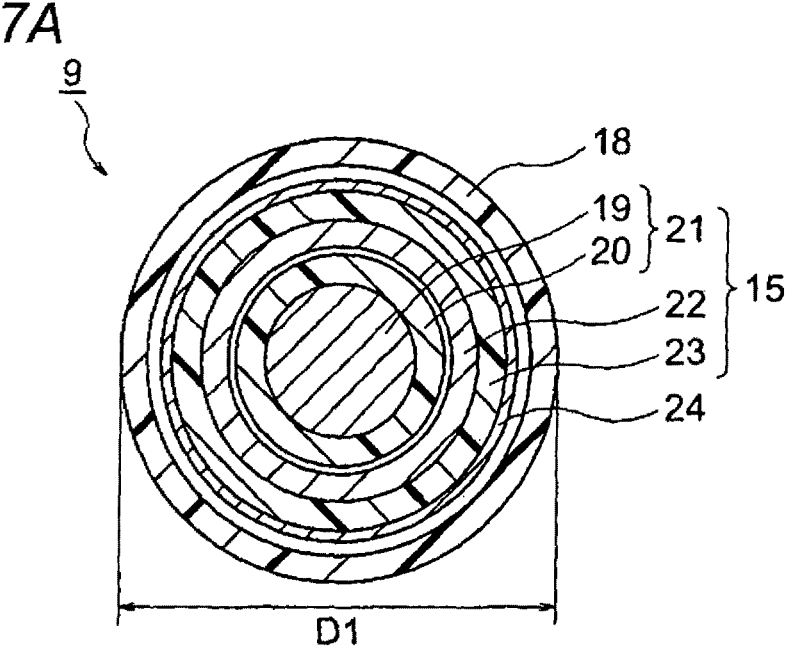
FIGS. 7A and 7B are cross sectional views showing the wire harness.
Figure 7B:
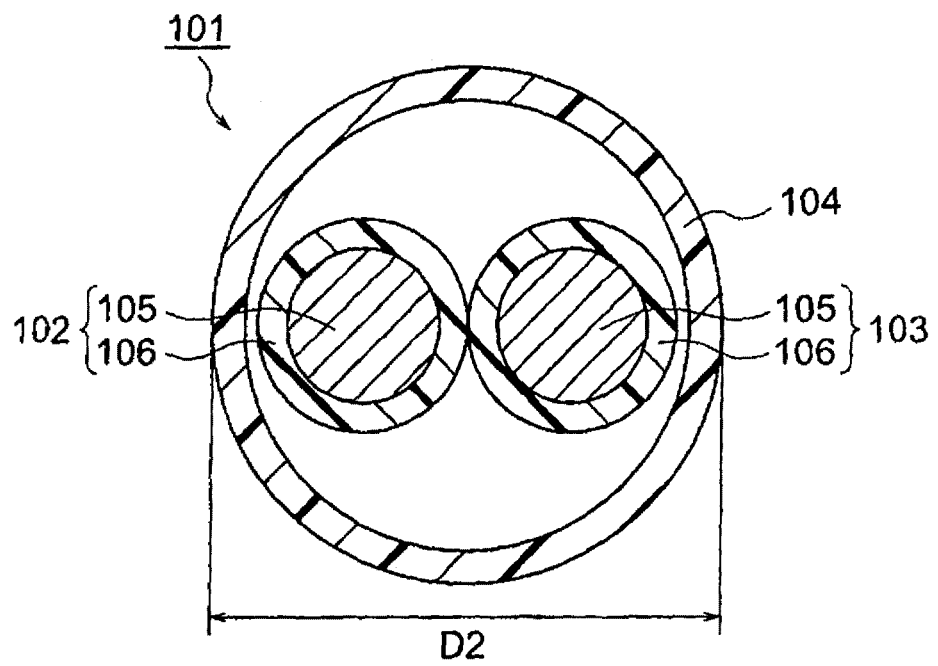

An embodiment of the invention will be described below with reference to the drawings. FIGS. 1A and 1B schematic views showing a high voltage conductive wire and a wire harness according to the invention. FIG. 1A is a schematic view showing an arrangement fashion of the wire harness, and FIG. 1B is a schematic view showing structures of the wire harness and the high voltage conductive wire. FIG. 2 is a cross sectional view showing the wire harness shown in FIG. 1 including both terminals thereof. FIG. 3 is an enlarged cross sectional view showing the terminal of the wire harness shown in FIG. 2. FIGS. 4A and 4B are schematic views explanatorily showing a method of attaching a conductive member to an end of a minus pole conductor. FIGS. 5A to 5C are schematic views explanatorily showing a method of attaching a terminal to an end of a minus pole conductor. FIG. 6 is a perspective view showing a condition that a bent section is formed on the wire harness. FIGS. 7A and 7B are cross sectional views showing wire harnesses. FIG. 7A is a cross sectional view showing the wire harness according to an embodiment of the invention and FIG. 7B is a cross section view showing the wire harness as a comparison example.

In the descriptions below, specific shapes, materials, values, directions or the like are examples for ease of understanding the invention, and can be changed corresponding to an application, a target, a specification or the like if necessary.

In the embodiment, descriptions are made by taking an example in which the wire harness of the invention is used in a hybrid vehicle (can be an electric vehicle).

In FIG. 1, a hybrid vehicle 1 is shown. The hybrid vehicle 1 is one which is driven by mixing two drive sources of an engine 2 and a motor unit 3, and is configured such that electric power is supplied to the motor unit 3 from a battery 5 (a battery pack) through an inverter unit 4. In the embodiment, the engine 2, the motor unit 3 and the inverter unit 4 are mounted in an engine room 6 where front wheels and the like are placed. The battery 5 is mounted on a vehicle rear section 7 where rear wheels are placed. The battery 5 can be mounted in a vehicle room which is located at a rear side of the engine room 6.

The motor unit 3 and the inverter unit 4 are connected to each other with a publicly known high voltage wire harness 8. The battery 5 and the inverter unit 4 are connected to each other with a wire harness 9 of the invention. The wire harness 9 is configured to transmit a high voltage current. The wire harness 9 is arranged such that its intermediate portion 10 is disposed at a ground side of a vehicle body underfloor portion 11. The wire harness 9 is arranged along and in roughly parallel to the vehicle body underfloor portion 11. The vehicle body underfloor portion 11 is a publicly known body and formed by a panel member, and a through-hole (not denoted by a symbol) is formed thereon at a predetermined position. The wire harness 9 is inserted into the through-hole.

The wire harness 9 and the battery 5 are connected to each other via a junction block 12 provided on the battery 5. A rear end 13 of the wire harness 9 is connected to the junction block 12 via a connector. A front end 14 of the wire harness 9 is connected to the inverter unit 4 via a connector.

Here, to additionally describe the embodiment, the motor unit 3 has a structure including a motor and a generator. In addition, the inverter unit 4 has a structure including an inverter and a converter. The motor unit 3 is formed as a motor assembly including a shield case. The inverter unit 4 is formed as an inverter assembly including a shield case. The battery 5 is of a Ni-MH type or a Li-ion type and is formed in a module. Meanwhile, it is possible to use a power storage device such as, for example, a capacitor. There are no particular limitations on the battery 5 as long as it can be used for the hybrid vehicle 1 or an electric vehicle.

First, the configuration and the structure of the wire harness 9 are described below.

The wire harness 9 is configured to include a high voltage conductive wire 15, terminals 16 and 17 (see FIG. 4) provided at ends of the high voltage conductive wire 15, an covering member 18 for the high voltage conductive wire 15, and an electromagnetic shield member 24 provided between the high voltage conductive wire 15 and the covering member 18.

The high voltage conductive wire 15 is configured to include a high voltage electric wire 21 having a first conductor 19 and a first insulator 20, a second conductor 22 provided so as to cover the high voltage electric wire 21, and a second insulator 23 that covers the minus pole conductor 22.

In the embodiment, the first conductor 19 performs as a plus pole, and the second conductor 22 performs as a minus pole. In contrast, the first conductor 19 may perform as the minus pole, and the second conductor 22 may performs as the plus pole.

As a material of the first conductor 19, a material having a structure to be a twisted wire conductor, and a material having a structure to be, for example, a circular bar wire in which is a conductor structure is a circular single core, a square bar in which a conductor structure is a square single core and a bus bar can be listed. In the embodiment, a material having a structure to be a twisted wire conductor is to be used. Incidentally, there are no particular limitations on the material thereof. That is, the material can be aluminum, aluminum alloy, copper or copper alloy.

The first insulator 20 is a coating with respect to the first conductor 19 and is formed by extrusion molding of a publicly known resin material.

The above described high voltage electric wire 21 is accommodated in a hollow portion of an inner part of the second conductor 22. The high voltage electric wire 21 is configured such that it is in contact with the inner face of the second conductor 22 so that heat generated on the high voltage electric wire 21 is to be absorbed by the second conductor 22. Incidentally, the second conductor 22 is configured such that the heat absorbed by it can be dispersed therefrom.

The pole conductor 22 is a metallic pipe having a circular cross section and is formed such that the high voltage electric wire 21 can be inserted and accommodated therein. The second conductor 22 of the embodiment is formed such that the high voltage electric wire 21 can be inserted and accommodated therein over its whole length. The second conductor 22 has a rigidity enabling holding of a shape of the wire harness 9 by itself. That is, the second conductor 22 has the rigidity by which when, for example, the second conductor 22 is bent from a straight state, it is not restored to its original state and maintains its bent shape.

A cross sectional area (a size) of the second conductor 22 is equal to or larger than a cross sectional area (a size) of the first conductor 19. That is, in a case where, for example, the size of the first conductor 19 is 15 square millimeters, the second conductor 22 is formed so as to have the size equal to or larger than 15 square millimeters. The reason is that it provides a merit of improving an electric stability. The cross sectional area of the second conductor 22 is set to be matched with the cross sectional area of the first conductor 19. Therefore, the thickness of the second conductor 22 is not increased even when it is made of the metallic pipe, and it is needless to say that the thickness and the diameter are markedly reduced as compared to a metallic pipe which has been used as a covering member heretofore. Preferably, the cross sectional area of the second conductor 22 is set to be equal to the cross sectional area of the first conductor 19.

The material of the second conductor 22 is to be chosen in consideration of the material, the cost or the like of the first conductor 19. The second conductor 22 of the embodiment is made of aluminum or aluminum alloy, but can be made of copper or copper alloy.

The second insulator 23 is a coating with respect to the second conductor 22 and is formed by extrusion molding or application of a publicly known resin material, or by winding an insulating tape up to a predetermined thickness. The second insulator 23 can be provided in such a fashion that it covers the outer face of the second conductor 22 in advance, or it covers the outer face of the second conductor 22 after the high voltage electric wire 21 is accommodated in the second conductor 22. Since the second insulator 23 is provided in such a fashion that it covers the outer face of the second conductor 22, the following effect is exhibited. That is, in a case where the electromagnetic shield member 24 is to be attached to the high voltage conductive wire 15, insulating of it from the second conductor 22 can be achieved without providing a special insulating member, and thereby the electromagnetic shield member 24 can be readily provided.

In FIGS. 1A to 3, a corrugate tube, a metallic pipe or the like can be listed as an example of the covering member 18. In the embodiment, a corrugate tube is to be used as the covering member 18. The covering member 18 is formed by choosing a resin material of which the various characteristics such as thermal resistance, abrasion resistance, weather resistance, impact resistance and the like are good. The surface of the covering member 18 is formed so as to correspond to the outer face of the wire harness 9. The covering member 18 is formed so as to protect the high voltage conductive wire 15 from spattering of a pebble or water. The covering member 18 is configured such that the high voltage conductive wire 15 accommodated therein is protected by a member in a pipe shape such as a corrugate tube or the like.

The electromagnetic shield member 24 is a member for electromagnetic shielding for countermeasure against an electromagnetic wave, and is formed in a cylinder by a braided wire cable having ultra fine wires in the embodiment. Meanwhile, a conductive metallic foil itself can be used as the electromagnetic shield member 24 as long as the countermeasure against an electromagnetic wave can be taken. The metallic foil has an advantage capable of markedly reducing the weight as compared to the braided wire cable.

The electromagnetic shield member 24 together with the first conductor 19 and the second conductor 22 are arranged in a coaxial fashion. In addition, the electromagnetic shield member 24 together with the first conductor 19 and the second conductor 22 are arranged so as to form a coaxial three-layer structure.

Next, a state in which a conductive member 26 is connected to an end 25 of the second conductor 22, is described below with reference to FIGS. 4A and 4B.

FIG. 4A is a schematic view showing one of ends of the wire harness 9 shown in FIG. 2. First, with regard to the terminal of the wire harness 9, the electromagnetic shield member 24 covering the end 25 of the second conductor 22 or the high voltage electric wire 21 is peeled (or slid) so as to expose the end 25 of the second conductor 22. The conductive member 26 for causing the second conductor 22 to branch from the high voltage conductive wire 15 is electrically connected to the end 25 of the second conductor 22. While there are no particular limitations on the conductive member 26, a high voltage electric wire formed by a conductor and an insulator covering the conductor is used in the embodiment. Other than that, for example, a terminal 27 or the like described later can be used. While there are no particular limitations on the method of connection between the second conductor 22 and the conductive member 26, the connection is carried out by welding in the embodiment. Other than that, the connection can be carried out by, for example, crimping or the like.

Next, as shown in FIG. 4B, an insulating treatment is carried out by using a member having an insulating property at a portion where the second conductor 22 and the conductive member 26 are electrically connected. In the embodiment, the insulating treatment is carried out in such a manner that an insulating tape 28 is wound around a connection portion. A method of insulating treatment is not limited to the above. For example, the connection portion can be covered with a resin having an insulating property.

In addition to the above, a case where the terminal 27 is connected to the end 25 of the second conductor 22, is described below.

FIG. 5A is a schematic view showing one of the terminals of the wire harness 9 shown in FIG. 2 similarly in FIGS. 4A and 4B. First, as shown in FIG. 5A, the electromagnetic shield member 24 is peeled (or slid) so as to expose the end 25 of the second conductor 22. The terminal 27 is an electric connection member to be provided on the end 25 of the second conductor 22 and is formed by press-processing a metallic plate having conductivity. The terminal 27 has an electric contact section 29 and an electric wire connection section 30.

As shown in FIG. 5B, with regard to the terminal 27, the electric wire connection section 30 is electrically connected to the end 25 of the second conductor 22. While there are no particular limitations on the method of connection, the connection is to be carried out by caulking in the embodiment.

Next, as shown in FIG. 5C, the conductive member 26 is electrically connected to the electric contact section 29 of the terminal 27. The conductive member 26 is a member for causing the second conductor 22 to branch from the high voltage conductive wire 15. In the embodiment, a high voltage wire constituted by a conductor and an insulator covering the conductor is used for the conductor member 26. While there are no particular limitations on the method of connection, the connection is to be carried out by caulking in the embodiment. Further, an insulating treatment is carried out by using a member having an insulating property at a portion where the end 25 of the second conductor 22, the terminal 27 and the conductive member 26 are electrically connected among each other. In the embodiment, the insulating treatment is carried out in such a manner that the insulating tape 28 is wound around the connection portion. Other than that, it is possible to carry out an insulating treatment in which the connection portion is covered with, for example, a resin having an insulating property.

In FIGS. 2, 4A and 4B, the terminals 16 and 17 are electric connection members provided at the terminals of the wire harness 9, and are formed by press-processing a metallic plate having conductivity. The terminal 16 is provided for the first conductor 19 and the terminal 17 is provided for the second conductor 22.

While there are no particular limitations on a method of attaching the terminals 16 and 17 to the first conductor 19 and the second conductor 22, the attaching is carried out by crimping in the embodiment. Other than that, the attaching can be carried out by welding or the like.

With regard to the wire harness 9 described above, when bending is applied to the wire harness 9 at a predetermined position by using a bender machine (not shown) after manufacturing the wire harness 9, a bent portion 31 is formed thereon as shown in FIG. 6. The predetermined position is position of arrow A in FIG. 6 for example. When the bent portion 31 is formed, the wire harness 9 is maintained in a shape along an arrangement pathway by a rigidity of the high voltage conductive wire 15. When the bent portion 31 is formed, the wire harness 9 is not restored to its original state due to the rigidity of the second conductor 22 and maintains its bent shape.

Incidentally, a damp 32 for fixing is shown. Since the high voltage conductive wire 15 accommodated in the wire harness 9 can maintain its shape, fixing can be sufficiently achieved by a small member such as the damp 32.

With regard to the bender machine (described above, but not shown), there are no particular limitations on a position where the machine is placed. That is, the position can be a cite for manufacturing a wire harness, or can be a cite for arranging a wire harness. The position where the machine is placed can be determined on an as-needed basis in consideration of its operability or the like.

In FIG. 1A, a connection portion 33 at the inverter side is configured such that the first conductor 19 and the second conductor 22 of the high voltage conductive wire 15 can be respectively connected to a plus circuit and a minus circuit of the inverter unit 4. In addition, the connection portion 33 at the inverter side is configured such that the electromagnetic shield member 24 on the high voltage conductive wire 15 can be connected to a shield case of the inverter unit 4. As shown in FIGS. 4A and 4B, the connection portion 33 at the inverter side is configured to have, for example, an insulative housing 35, the terminals 16 and 17, and a shield shell 36 and a shield ring 37 which are provided at a terminal of the electromagnetic shield member 24. Incidentally, a connection portion 34 at the battery side is configured similarly to the connection portion 33 at the inverter side so that the description is omitted here.

The arranged portion of the wire harness 9 is the vehicle body underfloor portion 11 and the like in the embodiment, but it is not limited to the above arranged portion.

Next, comparison between the embodiment of the invention and a comparison example is described below.

FIG. 7A is a cross section view showing the wire harness 9 according to the embodiment of the invention and FIG. 7B is a cross sectional view showing a wire harness 101 according to the comparison example.

The embodiment of the invention shown in FIG. 7A relates to the wire harness 9 and the high voltage conductive wire 15 according to the embodiment of the invention. The configurations of the wire harness 9 and the high voltage conductive wire 15 are the same as those of the embodiment of the invention described above so that the descriptions are omitted.

The comparison example shown in FIG. 7B is the wire harness 101 which is configured such that it is provided with two wires of high voltage conductive wires 102 and 103 for a plus circuit and a minus circuit and the two wires of high voltage conductive wires 102 and 103 are inserted into an covering member 104 (a metallic pipe). Each of the high voltage conductive wires 102 and 103 in the comparison example is constituted by a conductor 105 and an insulator 106 covering the conductor 105. The sizes of the conductor 105 and the insulator 106 of the high voltage conductive wires 102 and 103 are defined to be the same as the sizes of the first conductor 19 and the first insulator 20 of the high voltage electric wire 21 in the embodiment described above.

Since the two wires of high voltage conductive wires 102 and 103 are accommodated in the covering member 104 in such a fashion that the two wires are juxtaposed in the comparison example, the diameter D2 of the covering member 104 becomes large. In a case where the diameter D2 of the covering member 104 is large, when the wire harness 101 is arranged, for example, under a floor of a vehicle body, it is impossible to achieve arrangement of the wire harness 101 capable of providing a sufficient distance with respect to the ground.

Contrary to the above, since the high voltage conductive wire 15 according to the embodiment of the invention is configured such that the plus circuit and the minus circuit are formed not by two wires but by one wire, the diameter of the high voltage conductive wire 15 can be reduced. In addition, by manufacturing the wire harness 9 by implementing the above high voltage conductive wire 15, the diameter of the covering member 18 for protecting the wire harness 9 can be reduced (D1<D2).

Thus, in accordance with the embodiment of the invention, it is understood that the diameter of the high voltage conductive wire 15 or the diameter D1 of the covering member 18 of the wire harness 9 can be reduced as compared to the comparison example.

Thus, as described above with reference to FIGS. 1A to 7B, the invention provides the high voltage conductive wire 15 which is configured such that the plus circuit and the minus circuit are constituted not by two pieces but by one piece. To be specific, the high voltage conductive wire 15 is configured such that either one of the plus circuit and the minus circuit is constituted by the first conductor 19 and the first insulator 20, and the other one of the plus circuit and the minus circuit is constituted by the second conductor 22 and the second insulator 23. Therefore, an effect is exhibited that it is possible to provide the high voltage conductive wire 15 having the small diameter, which is configured such that the plus circuit and the minus circuit are constituted not by two pieces but by one wire.

In accordance with the invention, since the high voltage conductive wire 15 is configured to have the metallic pipe as the second conductor 22, an effect that a necessary and sufficient cross sectional area can be retained, is exhibited. In addition, for example, manufacturability can be improved. To be specific, in a case where the high voltage wire 21 constituted by the first conductor 19 and the first insulator 20 is accommodated in the metallic pipe, the manufacturing of the high voltage conductive wire 15 can be readily carried out. Therefore, an effect that the manufacturability can be improved is exhibited.

In accordance with the invention, the high voltage conductive wire 15 is configured to use the metallic pipe having the shape holding function as the second conductor 22. Therefore, an effect is exhibited that holding of a shape along an arrangement pathway can be achieved, or an effect that it is not necessary to separately provide a member for holding a shape along an arrangement pathway.

In addition, in accordance with the invention, the high voltage conductive wire 15 is configured such that the metallic pipe is used as the second conductor 22, and the conductive member 26 or the terminal 27 is used in a case where the end 25 of the metallic pipe is connected to a connection target. Therefore, an effect electric connection to the connection target can be appropriately carried out, is exhibited.

Further, in accordance with the invention, the wire harness 9 is configured such that the high voltage conductive wire 15 is protected by the covering member 18. Since the diameter of the high voltage conductive wire 15 is made small, the diameter D1 of the covering member 18 for protecting the high voltage conductive wire 15 is also made small. That is, it is possible to achieve the wire harness 9 of which the diameter is reduced. In accordance with the invention, since the diameter of the covering member 18 is reduced, the wire harness 9 is configured to achieve arrangement capable of providing a sufficient distance with respect to, for example, the ground, thereby ensuring a protection function. Therefore, a material of the covering member 18 is not necessarily limited to a metallic material.

In accordance with the above, according to the present invention, the high voltage conductive wire is formed such that a plus circuit and a minus circuit are constituted not by two wires but by one wire. To be specific, the high voltage conductive wire is configured such that either one of the plus circuit and the minus circuit is formed by either one of the plus pole conductor and the minus pole conductor and the first insulator, and the other one of the plus circuit and the minus circuit is formed by the other one of the plus pole conductor and the minus pole conductor and the second insulator. Since the high voltage conductive wire of the invention is configured such that two pieces are united into a single piece as described above, a diameter of the high voltage conductive wire formed by the signal piece is markedly smaller than a width of a high voltage conductive wire configured in such a fashion that the two pieces are juxtaposed. Since the two pieces are united into the single piece in the invention as described above, the high voltage conductive wire can be referred to as a compound conductive path, a compound electric wire, a coaxial compound conductive path, a coaxial compound electric wire, a coaxial conductive path, a coaxial wire or the like.

In addition, in accordance with the invention, the high voltage conductive wire is configured such that the metallic pipe is provided at the outside of the first insulator. By using the metallic pipe, it is possible to ensure a necessary and sufficient cross sectional area. In addition, it is possible to improve, for example, the manufacturability. To be specific, in a case where an electric wire formed by either one of the plus pole conductor and the minus pole conductor and the insulator is accommodated in the metallic pipe, it is possible to easily perform manufacturing of the high voltage conductive wire of the invention. The second insulator can be provided in such a fashion that it covers the outer face of the metallic pipe in advance, or it covers the outer face after the electric wire is accommodated therein. In a case where a shield structure is to be added to the high voltage conductive wire according to the invention, the adding can be easily carried out by providing the second insulator in such a fashion that it covers the outer face of the metallic pipe. Meanwhile, in a case where the metallic pipe is a commercial product, its cost can be effectively reduced.

Further, in accordance with the invention, the cross sectional area of the other one of the plus pole conductor and the minus pole conductor is set so as to be matched with the cross sectional area of either one of the conductors. Therefore, even in a case where the other one of the conductors is the metallic pipe, it is needless to say that the thickness or diameter is not enlarged and the thickness and the diameter are markedly smaller as compared to a covering member for a high voltage conductive wire.

In accordance with the invention, it is possible to achieve the high voltage conductive wire with the use of the metallic pipe having the shape holding function. To cause the metallic pipe to have the shape holding function, it is enough to use a metallic pipe which is plastically deformed when being bent. To be specific, it is enough to use a metallic pipe which can overcome restoring forces of either one of the plus pole conductor and the minus pole conductor, the first insulator and the second insulator with respect to bending.

In accordance with the invention, it is possible to achieve the high voltage conductive wire which is configured such that the metallic pipe is used as the other one of the plus pole conductor and the minus pole conductor, and the conductive member or the terminal is used in order to connect the end of the metallic pipe to a connection target. In accordance with the invention, even in a case where the metallic pipe is used, electric connection to a connection target can be appropriately carried out.

In accordance with the invention, it is possible to achieve the wire harness which is configured such that the high voltage conductive wire is protected by the covering member. Since the diameter of the high voltage conductive wire is reduced, the diameter of the covering member for protecting the same is also reduced. That is, the wire harness of which the diameter is reduced can be achieved. In accordance with the invention, since the diameter of the covering member is reduced, it is possible to achieve the wire harness which is configured to achieve arrangement capable of providing a sufficient distance with respect to, for example, the ground, thereby ensuring a protection function. Therefore, a material of the covering member is not necessarily limited to a metallic material.

In accordance with the invention, since the plus pole conductor, the minus pole conductor and the electromagnetic shield member are substantially formed in a coaxial three-layer structure, it is possible to achieve the wire harness capable of obtaining a shielding effect with respect to the high voltage conductive wire.

In accordance with the invention, since the wire harness capable of obtaining the shielding effect is achieved, the wire harness does not cause another conductive path or a device placed in close proximity to the wire harness to be influenced by noise.

Moreover, it is needless to say that various changes can be made without departing from the essence of the invention.

According to the present invention, there is provided a high voltage conductive wire of which the diameter can be reduced and a wire harness having a covering member of which the diameter can be reduced.

What is claimed is:
1. A high voltage conductive wire, comprising:
 a first conductor, configured to perform as one of a plus pole and a minus pole;
 a first insulator, provided outside of the first conductor;

a second conductor, configured to perform as the other of the plus pole and the minus pole, provided outside of the first insulator, and formed by a metallic pipe; and a second insulator, provided outside of the second conductor so as to cover an outer face of the second conductor, wherein a cross sectional area of the second conductor is set corresponding to a cross sectional area of the first conductor, and the second conductor is configured to have hardness enough to hold a bended shape of the high voltage conductive wire.

2. The high voltage conductive wire according to claim 1, wherein a conductive member or a terminal is connected to an end of the second conductor.

3. A wire harness, comprising:

the high voltage conductive wire according to claim 1; and a covering member, covering the high voltage conductive wire.

4. The wire harness according to claim 3, further comprising:

a electromagnetic shield member, provided between the high voltage conductive wire and the covering member.

* * * * *